US008498328B2

(12) United States Patent
Dhandu et al.

(10) Patent No.: US 8,498,328 B2
(45) Date of Patent: Jul. 30, 2013

(54) ENERGY MANAGEMENT FOR WIRELESS DEVICES

(75) Inventors: Siva Sandeep Dhandu, San Diego, CA (US); Christopher C. Riddle, San Diego, CA (US); Srividya Kunisetti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 478 days.

(21) Appl. No.: 12/578,124

(22) Filed: Oct. 13, 2009

(65) Prior Publication Data

US 2011/0085607 A1 Apr. 14, 2011

(51) Int. Cl.
*H04B 1/38* (2006.01)
*H04L 5/16* (2006.01)

(52) U.S. Cl.
USPC ........... 375/222; 375/219; 375/316; 375/346; 375/340; 375/259; 713/320; 713/321; 713/322; 713/323; 713/324; 455/574

(58) Field of Classification Search
USPC ............... 375/316, 346, 222, 219, 340, 259; 713/320–324; 455/574
See application file for complete search history.

(56) References Cited

U.S. PATENT DOCUMENTS

| | | | |
|---|---|---|---|
| 7,555,661 B2 * | 6/2009 | Luu | 713/320 |
| 7,561,858 B2 | 7/2009 | Nagano | |
| 7,561,859 B2 | 7/2009 | Nagano | |
| 7,574,229 B2 | 8/2009 | Kristensen et al. | |
| 7,860,018 B2 | 12/2010 | Raith | |
| 2002/0147932 A1 | 10/2002 | Brock et al. | |
| 2004/0235438 A1 | 11/2004 | Quilisch et al. | |
| 2005/0268133 A1 | 12/2005 | Beard | |
| 2006/0182021 A1 | 8/2006 | Kristensen et al. | |
| 2007/0083778 A1 | 4/2007 | Nagano | |
| 2007/0132607 A1 | 6/2007 | Nagano | |
| 2007/0287383 A1 | 12/2007 | Fan et al. | |
| 2009/0023402 A1 | 1/2009 | Shimizu et al. | |
| 2009/0215442 A1 | 8/2009 | Lindoff et al. | |
| 2009/0238086 A1 | 9/2009 | Ringstrom et al. | |
| 2009/0290625 A1 | 11/2009 | Riddle et al. | |
| 2010/0205464 A1 | 8/2010 | Rotem et al. | |
| 2010/0213919 A1 | 8/2010 | Takayanagi et al. | |
| 2011/0085607 A1 | 4/2011 | Dhandu et al. | |

FOREIGN PATENT DOCUMENTS

| | | | |
|---|---|---|---|
| EP | 1422596 A2 | 5/2004 | |
| EP | 1422596 A2 | 5/2004 | |
| EP | 1758302 A1 | 2/2007 | |
| EP | 1758302 A1 | 2/2007 | |
| EP | 1873652 A2 | 1/2008 | |

(Continued)

OTHER PUBLICATIONS

International Search and Written Opinion—PCT/US2010/052544, ISA/EPO—Jul. 15, 2011.

(Continued)

*Primary Examiner* — Phuong Phu
(74) *Attorney, Agent, or Firm* — Donald C. Kordich

(57) ABSTRACT

A method for managing energy usage of a wireless device during a data transfer in a wireless communication network comprises determining a data rate associated with the data transfer, determining data processing requirements for processing data at the determined data rate, and dynamically adjusting, based on the determined requirements, one or more data processing parameters corresponding to the data transfer.

47 Claims, 3 Drawing Sheets

FOREIGN PATENT DOCUMENTS

| | | |
|---|---|---|
| EP | 1873652 A2 | 1/2008 |
| GB | 2389022 A | 11/2003 |
| GB | 2389022 A | 11/2003 |
| JP | 11505380 | 5/1999 |
| JP | 2002531023 A | 9/2002 |
| JP | 2006279815 A | 10/2006 |
| JP | 2007148572 A | 6/2007 |
| JP | 2008131319 A | 6/2008 |
| WO | 9633555 | 10/1996 |
| WO | 0031990 A2 | 6/2000 |
| WO | 2007025139 A2 | 3/2007 |
| WO | WO2007025139 A2 | 3/2007 |

OTHER PUBLICATIONS

International Preliminary Report on Patentability—PCT/US2010/052544, The International Bureau of WIPO—Geneva, Switzerland, Apr. 26, 2012.

International Search Report—PCT/US2009/045077—International Search Authority, European Patent Office, Jan. 15, 2010.

International Search Report and Written Opinion—PCT/US2010/052544, ISA/EPO—Jul. 15, 2011.

Written Opinion—PCT/US2009/045077—ISA/EPO—Jan. 15, 2010.

* cited by examiner

ENERGY MANAGEMENT FOR WIRELESS DEVICES

REFERENCE TO CO-PENDING APPLICATIONS FOR PATENT

The present Application for Patent is related to the following co-pending U.S. patent application: "THERMAL MANAGEMENT FOR DATA MODULES" having and Ser. No. 12/470,354 filed on May 21, 2009 to the assignee hereof, and expressly incorporated by reference herein.

FIELD OF DISCLOSURE

The present disclosure relates generally to circuits, and more specifically to techniques, systems, and methods for energy management for wireless devices.

BACKGROUND

In many wireless systems, data rates for a given data transfer are assigned to devices based on the signal conditions each device experiences as part of the network. Typically, higher data rates are assigned to devices in good signal conditions, whereas lower data rates are assigned to devices in poor signal conditions. This allows network operators to improve overall system bandwidth because network resources are not wasted on devices that cannot efficiently use them. Different algorithms (i.e., scheduling algorithms) may be used by different systems to optimize the bandwidth.

For example, network resources are usually divided among several physical channels, including both "data" channels used to send traffic/packet data and "control" channels used to send overhead/control data. Channel conditions of received forward link transmissions can be observed by a wireless device (e.g., based on pilot signals) and reported back to a base station. The base station then uses this knowledge to selectively schedule transmissions to the wireless device, including setting the data rate at which transmissions are sent. Different data rates correspond to transmitting data in formats that carry more information bits (i.e., at a higher data rate) or in formats that carry less information bits (i.e., at a lower data rate). That is, if the signal conditions are poor, data can be transmitted in a transmission format with additional redundancies so that corrupted symbols are more likely to be recoverable. Hence, the data rate is lower than if a transmission format without these redundancies were used instead.

Because higher data rates provide more data throughput, higher data rates also require heightened data processing capabilities from both the receiving and transmitting devices. However, when a device configured to process data at a high data rate experiences poor signal conditions and is forced to operate under a reduced data rate, those enhanced processing capabilities are wasted on the lower data rate processing. For example, a 1 GHz processor with a corresponding operating voltage of 1.2V may be needed to process communications at the Evolution-Data Optimized (EV-DO) RevA forward link theoretical maximum data rate of 3.1 Mb/s, but would be an unnecessary drain on energy resources for communications at a lower data rate of 78.6 Kb/s. Heretofore, system designers have neglected the effects of changing data rates on energy consumption (e.g., battery life) when setting the processing parameters of a wireless device.

SUMMARY

Exemplary embodiments of the invention are directed to systems and methods for dynamic energy management in wireless devices.

One embodiment is directed to a method for managing energy usage of a wireless device during a data transfer in a wireless communication network. The method comprises determining a data rate associated with the data transfer, determining data processing requirements for processing data at the determined data rate, and dynamically adjusting, based on the determined requirements, one or more data processing parameters corresponding to the data transfer.

Another embodiment is directed to a wireless device for transferring data in a wireless communication network. The wireless device comprises one or more circuit components configured to support the data transfer, a processor for managing energy use of the one or more circuit components during the data transfer, and a memory coupled to the processor. The processor is configured to determine a data rate associated with the data transfer, to determine data processing requirements for processing data at the determined data rate, and to dynamically adjust, based on the determined requirements, one or more data processing parameters corresponding to the data transfer.

Another embodiment is directed to a computer-readable storage medium comprising code, which, when executed by a processor, causes the processor to perform operations for managing energy usage of a wireless device during a data transfer in a wireless communication network. The computer-readable storage medium comprises code for determining a data rate associated with the data transfer, code for determining data processing requirements for processing data at the determined data rate, and code for dynamically adjusting, based on the determined requirements, one or more data processing parameters corresponding to the data transfer.

Another embodiment is directed to a wireless device for transferring data in a wireless communication network. The wireless device comprises one or more circuit component means for effectuating the data transfer and power management means for managing energy use of the one or more circuit component means during the data transfer. The power management means comprises means for determining a data rate associated with the data transfer, means for determining data processing requirements for processing data at the determined data rate, and means for dynamically adjusting, based on the determined requirements, one or more data processing parameters corresponding to the data transfer.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
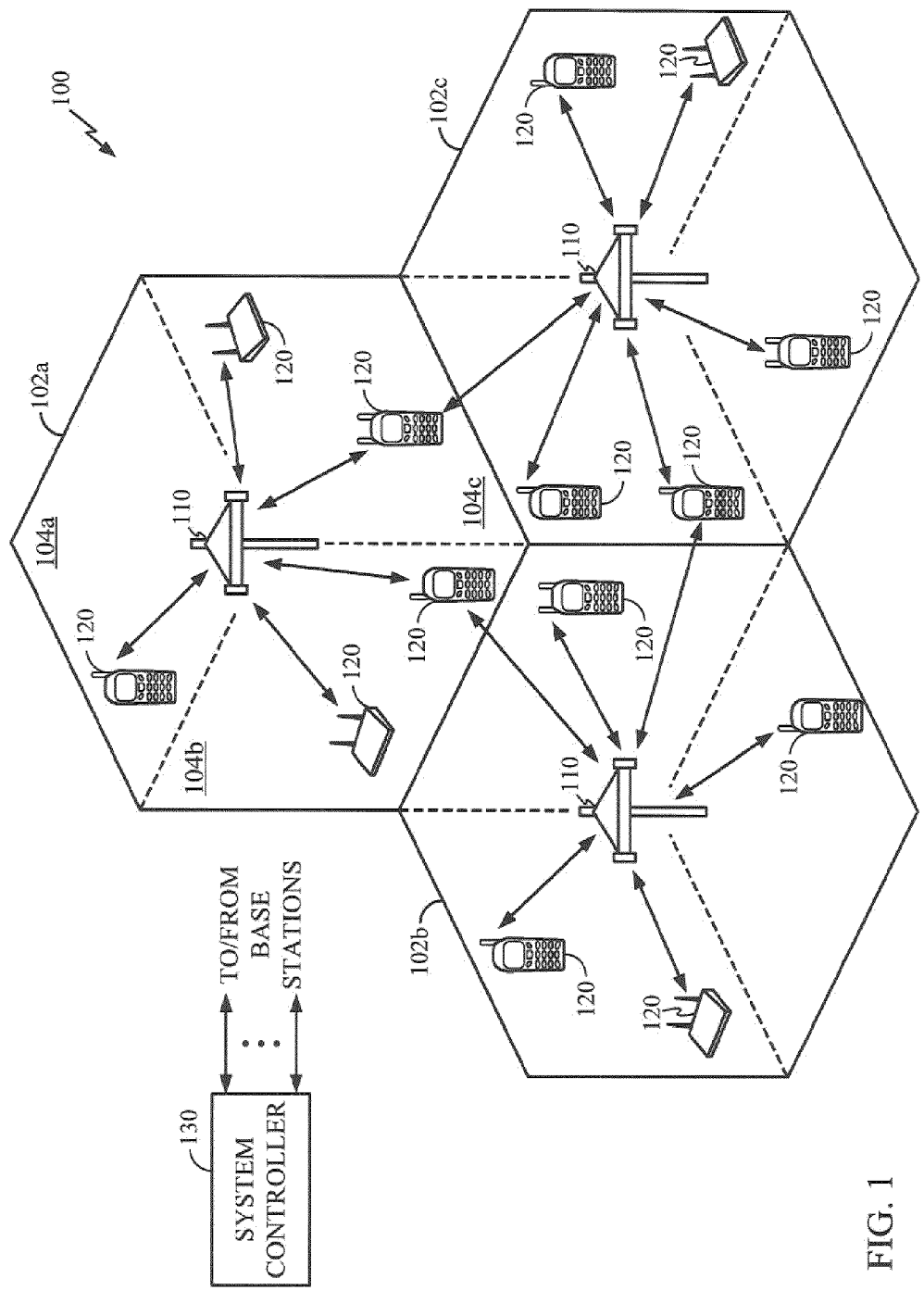
FIG. 1 illustrates an example wireless communication system in accordance with various embodiments presented herein.

Aspects of the invention are disclosed in the following description and related drawings directed to specific embodiments of the invention. Alternate embodiments may be devised without departing from the scope of the invention.

Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. As used herein, "forward link" refers to the transmissions directed from a base station to a wireless device and "reverse link" refers to transmissions directed from a wireless device to a base station.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Cdma2000 is described in documents from an organization named "3rd Generation Partnership Project 2" (3GPP2).

These various radio technologies and standards are well-known in the art, and in some instances may be used in combination with each other. For example, a wireless network may support a low speed interface primarily for voice communication (e.g., IS-95/TIA-EIA-95/cdmaOne or GMS) and one or more high speed interfaces for data transfer, such as General Packet Radio Service (GPRS), IS-856/Evolution-Data Optimized (EV-DO), High Speed Downlink Packet Access (HSDPA), Universal Mobile Telecommunication Systems (UMTS).

As discussed in the background, higher data rates are usually desirable because they provide more data throughput and wireless devices have conventionally been designed with heightened data processing capabilities. However, these heightened data processing capabilities have heretofore been fixed such that they are used even when poor channel conditions force a wireless device to operate at a reduced data rate. These heightened data processing capabilities may therefore unnecessarily consume the wireless device's energy resources. Accordingly, the present disclosure provides techniques to dynamically adjust at run-time various data processing parameters of a wireless device (e.g., clock/voltage settings of modems, processors, memories, data buses, etc.) based on the actual data rate assigned or anticipated to be assigned to the wireless device. It will be appreciated that the energy management techniques presented herein are equally applicable to data downloads and data uploads.

FIG. 1 illustrates an example wireless communication system 100 in accordance with various embodiments presented herein.

In general, the wireless communication system 100 includes multiple base stations 110 and multiple wireless devices 120. The base stations 110 are stations that provide communication with one or more of the wireless devices 120, and may also be referred to as, or include at least some of the functionality of, an access point, a Node B, and/or some other network entity. Each base station 110 provides communication coverage for a particular geographic area 102, which may be referred to as a "cell." To improve system capacity, a base station coverage area 102 can be further partitioned into multiple smaller areas (e.g., the three smaller areas 104a, 104b, and 104c as shown), which may be referred to as a "sector." While FIG. 1 depicts physical sectors (e.g., those having different antenna groups for different sectors), other approaches can be utilized as well. For example, multiple fixed "beams" that each cover different areas of the cell in frequency space can be employed in lieu of, or in combination with physical sectors. For simplicity, in the following description, the term "base station" is used generically for a station that serves a given cell, sector, and/or beam.

For a centralized architecture, a system controller 130 couples to the base stations 110 and provides coordination and control for these base stations 110. The system controller 130 can be a single network entity or a collection of network entities. For a distributed architecture, the base stations 110 can communicate with one another as needed. The system controller 130 can provide one or more connections to multiple networks (e.g., the Internet, other packet based networks, circuit switched voice networks that provide information to and/or from the wireless devices 120 in communication with the base stations 110 of the wireless communication system 100, etc.). The system controller 130 can include and/or can be coupled with a scheduler that schedules transmission from and/or to the wireless devices 120. Additionally or alternatively, the scheduler can reside in each individual base station 110, sectors of cells, etc.

Wireless devices 120 are typically dispersed throughout the wireless communication system 100, and each wireless device 120 can be fixed or mobile. A wireless device 120 can also be referred to as, or can include at least some of the functionality of, a mobile station, user equipment, an access terminal, a handset, and/or some other device. Each wireless device 120 can be a cellular phone, a personal digital assistant (PDA), a wireless modem card, a data module, and so on. Each wireless device 120 can communicate with zero, one, or multiple base stations 110 on the forward and reverse links at any given moment.

In general, each wireless device's 120 communications introduce interference to the other wireless devices 120. To overcome interference in the received signals, each communication seeks to maintain a sufficient ratio of bit energy to interference power spectral density ($E_b/N_0$) to demodulate the signals at an acceptable error-rate. Various power control schemes are used to adjust the transmission power in one or both of the forward and the reverse links to satisfy given error-rate criteria. Ideally, the power control process adjusts the transmitter power to achieve at least the minimum required $E_b/N_0$ at the designated receiver. However, it is also desirable that no transmitter use more than the minimum $E_b/N_0$. This ensures that any benefit to one wireless device 120 achieved through the power control process is not at the unnecessary expense of any other wireless device 120.

Figure 2:
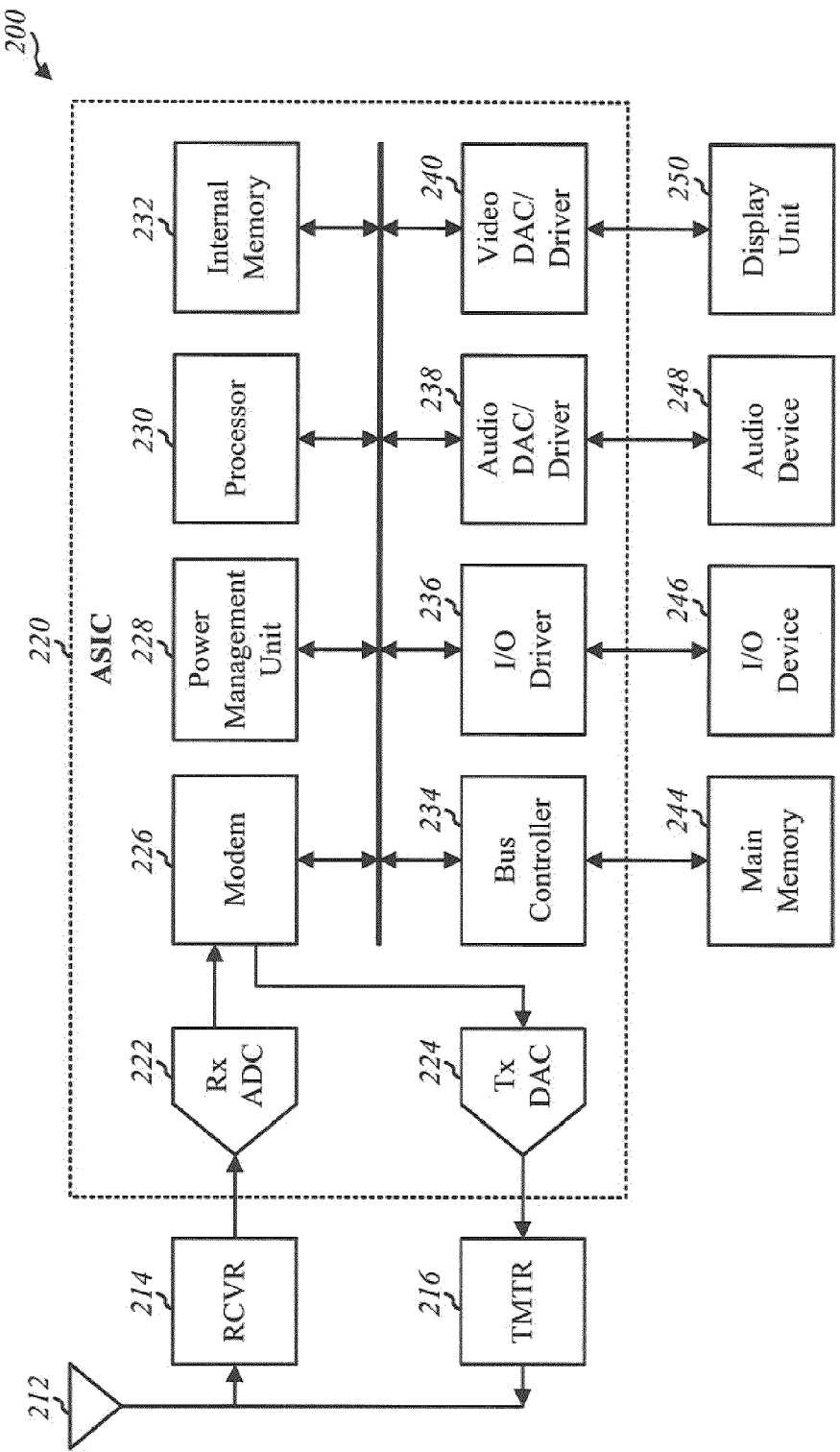
FIG. 2 is an example block diagram design of a wireless device for operation in the wireless communication system of FIG. 1.

FIG. 2 is an example block diagram design of a wireless device 120 for operation in the wireless communication system 100 of FIG. 1.

As shown, the wireless device 120 is capable of providing bi-directional communication via a receive path and a transmit path. On the receive path, signals transmitted by the base station 110 are received by an antenna 212 and provided to a receiver 214. The receiver 214 conditions the received signal (e.g., filters, amplifies, downconverts) and provides an analog input signal to an application specific integrated circuit (ASIC) 220. On the transmit path, a transmitter 216 receives and conditions an analog output signal from the ASIC 220 and generates a transmission signal, which is transmitted via antenna 212 to the base station 110.

The ASIC 220 includes various processing, interface, and memory units, such as a receive analog-to-digital converter (Rx ADC) 222, a transmit digital-to-analog converter (Tx DAC) 224, a modem 226, a power management unit 228, a processor 230, an internal memory 232, an external bus interface 234, an input/output (I/O) driver 236, an audio DAC/driver 238, and/or a video DAC/driver 240. The Rx ADC 222 digitizes the analog input signal from the receiver 214 and provides samples to the modem 226. The modem 226 performs processing for data transmission and reception, such as encoding, modulation, demodulation, decoding, etc. The Tx DAC 224 converts the output of modem 226 from digital to analog form, and provides the analog output signal to the transmitter 216. The processor 230 performs various types of processing for the wireless device 120, such as processing for video, graphics, higher layer applications, etc., as well as directing the operation of various processing and interface units within the ASIC 220. The internal memory 232 stores data and/or instructions for various units within the ASIC 220.

A bus controller 234 facilitates transfer of data within the ASIC 220, and between the ASIC 220 and a main memory 244. An I/O driver 236 drives an I/O device 246 via an analog or digital interface. An audio DAC/driver 238 drives an audio device 248, which may be a speaker, a headset, an earpiece, etc. A video DAC/driver 240 drives a display unit 250, which may be a liquid crystal display (LCD), etc.

The power management unit 228 manages power use of the wireless device 120 by dynamically adjusting at run-time various data processing parameters of the wireless device 120 (e.g., clock/voltage settings of modems, processors, memories, data buses, etc.) based on the actual data rate assigned or anticipated to be assigned to the wireless device 120. For example, if the wireless device 120 is assigned a relatively low data rate, the power management unit 228 can lower the clock frequency and corresponding operating voltage of the Rx ADC 222, the Tx DAC 224, the modem 226, the processor 230, the internal memory 232, the external bus interface 234, the I/O driver 236, the audio DAC/driver 238, and/or the video DAC/driver 240, where adjustment is permitted. If the wireless device 120 is assigned a relatively high data rate, the power management unit 228 can increase the clock frequency and voltage settings of these circuit components. It will be appreciated that in one or more designs, some or all of the power management unit's 228 operations may be performed instead by a general purpose processor, such as the processor 230 of FIG. 2 or a separate processor.

It will also be appreciated that each of the components of the wireless device 120 illustrated in FIG. 2 may include various sub-components. For example, the modem 226 may include a rake receiver, an equalizer, a turbo-decoder, a deinterleaver, etc. (not shown). Further, the processing parameters of these sub-components may be independently controllable by the power management unit 228. Some of the sub-component processing parameters may be controlled independently of the data rate (e.g., an equalizer) while others may not (e.g., a turbo-decoder).

Because power consumption generally scales exponentially with voltage and linearly with clock frequency, a reduction in the clock/voltage settings can help to ensure that energy resources are used more efficiently. Moreover, reducing the clock/voltage settings reduces energy consumption (e.g., extends battery life) without further limiting performance because the reduced data rate does not require the same level of processing power as the higher data rates that the wireless device 120 may have been designed to support. In one design, power consumption was tested at different data rates using the same or comparable wireless devices (i.e., using the same chipset and operating software) in similar network conditions (i.e., similar receive power and total transmit power). The results are presented in Table 1 below, which illustrates a decrease in operating current consumption for lower data rates.

TABLE 1

| Type of Data Transfer | Data Rate | Current Consumption |
| --- | --- | --- |
| HSDPA Download | 5938 kb/s | 293 mA |
| HSDPA Download | 3206 kb/s | 282 mA |
| HSDPA Download | 1380 kb/s | 271 mA |
| Release 99 Data Download | 365 kb/s | 260 mA |

Figure 3:
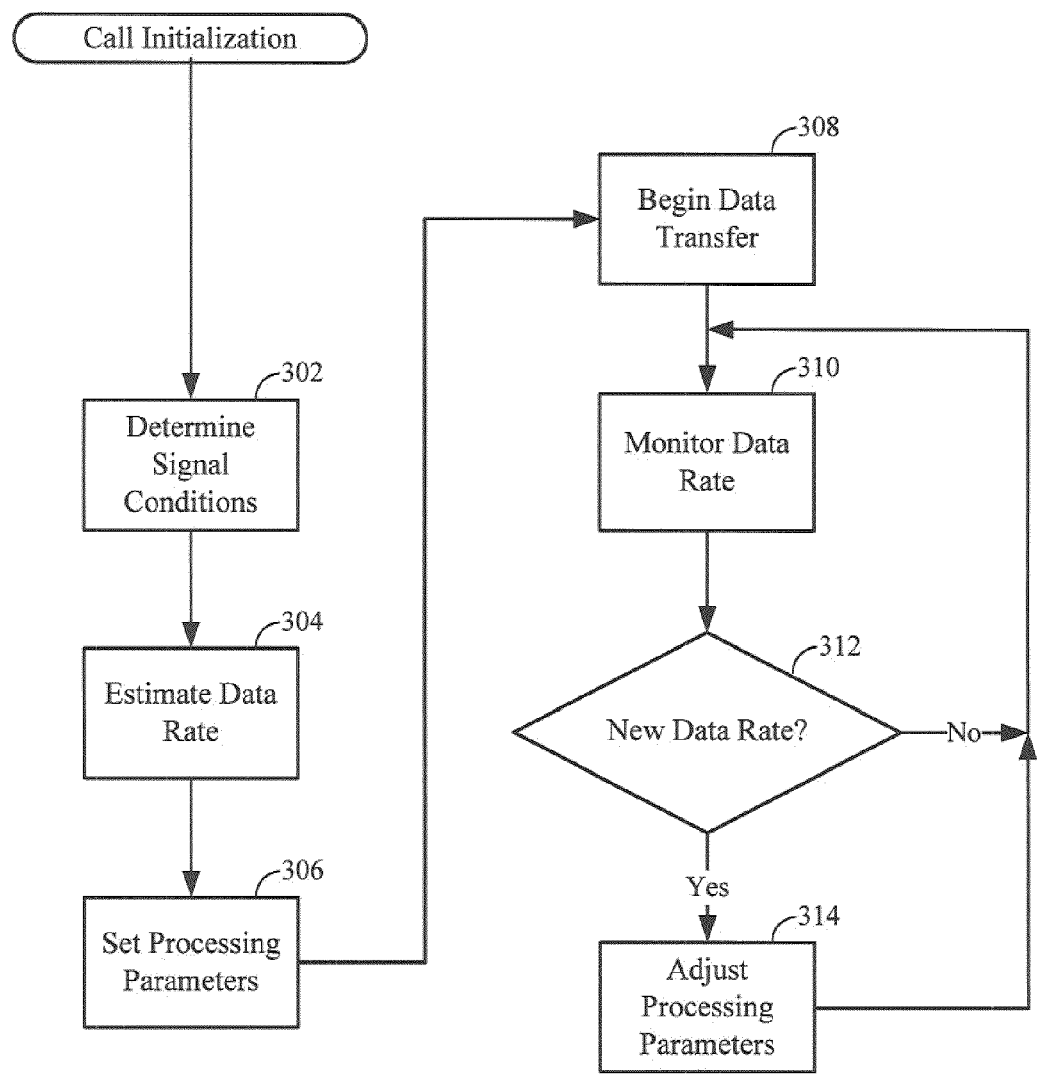
FIG. 3 is a flowchart illustrating a basic overflow of the power management operations performed by the power management unit or another entity according to various embodiments.

FIG. 3 is a flowchart illustrating a basic overflow of the power management operations performed by the power management unit 228 or another entity according to various embodiments.

At call setup, the wireless device 120 typically determines the signal conditions of one or more communication links (e.g., based on received pilot signals) with the base station 110 (block 302). Several parameters, characteristic values, etc., can be monitored by the wireless device 120 in characterizing the signal conditions. Two example measurements of the signal conditions that may be used, either individually or in combination, are the received power (e.g., the received signal strength indication (RSSI)) and the signal quality (e.g., the signal-to-noise ratio (SNR), the carrier-to-interference ratio (C/I), the $E_b/N_0$, etc.). The received power coming in on a channel generally indicates the strength of the received signal, ranging from a relatively strong signal (e.g., around −30 dBm or even higher) to a relatively weak signal (e.g., around −100 dBm or even lower). The signal quality of the channel generally compares the level of a desired signal from the base station 110 to the level of background noise. The higher the ratio of desired signal to background, the less obtrusive the background noise is. In some instances, the wireless device 120 may experience poor signal conditions despite receiving a strong signal. For example, a jamming device emits a powerful signal but with no useable information. Accordingly, the received power and signal quality measurements refer to different but related aspects of the signal conditions on the channel. In some embodiments, they are advantageously used in combination to give a more complete depiction of the channel's operating capabilities.

As discussed above with reference to FIG. 1, in many systems the monitored signal conditions are directly or indirectly transmitted to the base station 110. These transmissions can take the form of a channel quality indicator (CQI) (e.g., in 3GPP) and/or a data rate control message (DRC) (e.g., in 3GPP2), for example. This signal condition feedback provides valuable information to the base station 110 or system controller 130 in determining the proper data rate, encoding, modulation, and scheduling of data communications. In a packet-switched data system, for example, a DRC message may be sent to the base station 110 to indicate the maximum data rate at which data can be transmitted over the communication link with a predetermined bit error rate (BER).

In general, the signal conditions of a given communication link are related to the data rate at which the base station 110 may transmit data to the wireless device 120 on that communication link. Thus, the wireless device 120 can often estimate an expected data rate it anticipates to be assigned by the base station 110 or system controller 130 based on the signal conditions monitored during call setup (block 304). For example, in the TIA-856 standard for EV-DO Rev0, there is a DRC Channel which wireless devices use to indicate to the network what forward link data rate they can sustain. A wireless device requesting the highest data rate on the forward link sends a DRC=12, which corresponds to a data rate of 2457.6 Kb/s.

Based on the expected data rate, the power management unit 228 determines the appropriate clock frequencies and corresponding operating voltages of the processors, memories, buses, etc., of the wireless device 120, and sets these processing parameters to an initial, desired level (block 306). The goal is to attempt to minimize overall energy consumption. As discussed above, additional processing resources used beyond those required may unnecessarily waste the limited energy (e.g., battery life) of the wireless device 120. For example, suppose the wireless device 120 is operating in poor signal conditions (e.g., −100 dBm of received power and −16 db $E_b/N_0$) and wishes to begin a data call (e.g., a user wishes to check e-mail on a web browser). Here, the base station 110 or system controller 130 is likely to assign the lowest data rate to the wireless device 120 (e.g., 100 kb/s). This data rate requires only relatively low processing power (e.g., 100 MHz on a main processor or data bus) to decode incoming data packets, for example. Thus, preemptively lowering the corresponding clock frequencies allows the power management unit 228 to lower a corresponding operating voltage (e.g., from about 1.2V down to about 1.1V or about 1.0V), which advantageously lowers energy consumption without impacting perceived performance.

The appropriate data processing settings for a given data rate may also be context specific and depend on the application(s) running on the wireless device 120. In some embodiments, the power management unit 228 may run the wireless device 120 using the lowest data processing settings needed to properly encode/decode data (e.g., minimum clock speeds, bus speeds, etc.) at the expected data rate. In other embodiments, the power management unit 228 may run the wireless device 120 using intermediate data processing settings (i.e., above the minimum data processing settings but still below the system's design capabilities) in an effort to conserve overall energy for the application by completing a particular task more quickly. Again, the power management unit 228 attempts to minimize overall energy consumption, not simply instantaneous power.

For example, voice call applications involve real-time operations where the duration of the call is not impacted by the processing parameters selected. Thus, the wireless device 120 can use the lowest data processing settings needed to properly encode/decode data while still providing the desired voice quality. In this case, minimizing instantaneous power is equivalent to minimizing overall energy consumption. By contrast, data call applications (e.g., web browsing) may vary in duration based on the processing parameters selected. That is, different processing parameters may extend or shorten the amount of time needed to complete a given task within the application. In this case, energy consumption may be negatively impacted by processing the data more slowly over a longer period of time. For example, a slow processor 230 may drag out operation of the modem 226. Thus, it may be more energy efficient at times to set the processing parameters so that some of the components (e.g., processor 230) are run faster than their minimum requirements in order to shorten download times.

In one test of a particular web browser, the processor 230 was initially operated at higher clock speeds and operating voltages to more quickly complete a web page download over the air. Then, the processor 230 was switched to a lower clock speed and operating voltage setting once the data transfer was complete. It was found that in this case, temporarily elevating the clock speeds and operating voltages was more energy efficient than running through the entire web browsing operation at lower clock speeds and operating voltages.

It will be appreciated that the application context discussed above may not equally affect all of the components of wireless device 120. In various embodiments, some components may be scaled with the data rate independent of the application context (e.g., Rx ADC 222, Tx DAC 224, modem 226), while other components may be scaled with the data rate but dependent on the application context (e.g., processor 230, internal memory 232, audio DAC/driver 238, video DAC/driver 240). Moreover, as discussed above with regard to FIG. 2, each of the sub-components (not shown) of the various components of the wireless device 120 may be independently controlled, and may likewise vary in their dependence on the application context. Accordingly, in some embodiments, the appropriate data processing settings for each component/sub-component at different data rates are determined via empirical methods (e.g., simulation, experimentation, etc.), and stored in a lookup table or the like.

In some cases, the power management unit 228 may wish to restrict the data rate itself of the data transfer to below the maximum data rate allowed under the monitored signal conditions. For example, if the wireless device 120 is also running thermal management procedures, the power management unit 228 may set a maximum data rate threshold to limit the data rate to an acceptable level. If the threshold is exceeded by the expected data rate, the power management unit 228 restricts the data rate to the predetermined acceptable level. In some designs, the restricted data rate is achieved through coordination with the base station 110, such as by artificially biasing any signal quality feedback information (e.g., SNR, CQI, DRC, etc.) to imitate a lower quality of signal reception. By reporting to the base station 110 artificially poor signal conditions, the base station 110 should subsequently reduce the data rate allocated to the wireless device 120 and begin transmitting packets at or below the reduced data rate.

Under normal circumstances, the wireless device 120 is assigned the expected data rate corresponding to the signal conditions it experiences, and data transfer begins using the preset data processing parameters (block 308). However, sometimes the base station 110 or system controller 130 assigns the wireless device 120 a data rate that is either higher or lower than the expected data rate. Moreover, signal conditions often fluctuate during a data call (e.g., as the user moves around), and the base station 110 or system controller 130 may change the assigned data rate during the call based on these fluctuations, or based on other system considerations. Accordingly, the wireless device 120 continues to monitor its assigned data rate after the data call begins (block 310). In many systems, the wireless device 120 also continues to provide signal condition feedback (e.g., subsequent DRC messages) to the base station 110 to help the base station 110 or system controller 130 maintain an appropriate data rate for the data transfer.

If the data rate is unchanged (no in block 312), the power management unit 228 takes no further action and continues to monitor its assigned data rate (block 310). When the data rate is changed (yes in block 312), the power management unit 228 determines the appropriate clock frequencies and corresponding operating voltages of the processors, memories, buses, etc., of the wireless device 120, and readjusts these data processing parameters when desired (block 314). For example, if the wireless device 120 estimates that a data rate of only 100 kb/s is going to be assigned to it, but the wireless device 120 is actually assigned data rate of 500 kb/s, the power management unit 228 increases the clock frequency and corresponding voltage from the initial processing parameter settings. Conversely, if the wireless device 120 is actually assigned only 50 kb/s, there will be enough headroom in the data processing parameters to process the data, but the power management unit 228 may decide (for any one of the reasons provided herein) to decrease the processing parameters for energy saving purposes.

In some embodiments, such as where the data rate is determined according to the applicable communications standard, the power management unit 228 preemptively adjusts the processing parameters during the call based on an anticipated data rate change in accordance with changing signal conditions, much like with the initial power management procedures during call setup.

The techniques described above are applicable to a wide range of wireless devices, such as mobile handsets, GPS devices, pagers, personal digital assistants (PDAs), etc., each of which may have different processing parameters that can be adapted in a manner appropriate for that particular platform. Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Accordingly, an embodiment of the invention can include a computer readable media embodying a method for dynamically adjusting at run-time various data processing parameters of a wireless device (e.g., clock/voltage settings of modems, processors, memories, data buses, etc.) based on the actual data rate assigned or anticipated to be assigned to the wireless device. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for managing energy usage of a wireless device during a data transfer in a wireless communication network, the method comprising:
    determining a data rate associated with the data transfer;
    determining data processing requirements for processing data at the determined data rate;
    reducing, based on the determined requirements, a clock speed associated with one or more data processing parameters corresponding to the data transfer from a previous level;
    reducing a corresponding operating voltage from a previous level in accordance with the reduced clock speed;
    increasing, based on changed requirements, the clock speed from a previous level; and increasing the corresponding operating voltage from a previous level in accordance with the increased clock speed.

2. The method of claim 1, wherein the reducing is performed at run-time.

3. The method of claim 1, wherein processing data comprises at least one of encoding the data for transmission or decoding the data from received signals.

4. The method of claim 3, wherein the data processing requirements indicate a minimum data processing speed needed to properly encode or decode the data at the determined data rate.

5. The method of claim 1, wherein the clock speed is associated with at least one of:
   a modem used to modulate or demodulate data associated with the data transfer;
   a data processor used to process data associated with the data transfer;
   a memory used to store data associated with the data transfer; or
   a data bus used to move data associated with the data transfer between processing components.

6. The method of claim 1, wherein determining the data rate comprises:
   determining, during a call setup, one or more signal conditions of a communication link associated with the data transfer; and
   estimating, prior to beginning the data transfer, a data rate expected to be assigned to the wireless device based on the signal conditions.

7. The method of claim 6, wherein the signal conditions are indicated by at least one of a received power measurement or a signal quality measurement.

8. The method of claim 1, wherein determining the data rate comprises monitoring, during the data transfer, a data rate assigned to the wireless device.

9. The method of claim 8, further comprising adjusting, based on any changes to the data rate, the one or more data processing parameters corresponding to the data transfer.

10. The method of claim 1, further comprising artificially biasing signal quality feedback information intended for a base station to imitate a lower quality of signal reception than actually received if the determined data rate is above a predetermined threshold.

11. The method of claim 9, wherein at least one data processing parameter is adjusted to a level above the determined requirements based upon one or more applications running on the wireless device.

12. A wireless device for transferring data in a wireless communication network, the wireless device comprising:
   one or more circuit components configured to support the data transfer;
   a processor configured to manage energy use of the one or more circuit components during the data transfer, wherein the processor is configured:
      to determine a data rate associated with the data transfer,
      to determine data processing requirements for processing data at the determined data rate,
      to reduce, based on the determined requirements, a clock speed associated with one or more data processing parameters corresponding to the data transfer from a previous level,
      to reduce a corresponding operating voltage from a previous level in accordance with the reduced clock speed,
      to increase, based on changed requirements, the clock speed from a previous level, and
      to increase the corresponding operating voltage from a previous level in accordance with the increased clock speed; and
   a memory coupled to the processor.

13. The wireless device of claim 12, wherein the processor is further configured to process data associated with the data transfer.

14. The wireless device of claim 12, wherein processing data comprises at least one of encoding the data for transmission or decoding the data from received signals.

15. The wireless device of claim 14, wherein the data processing requirements indicate a minimum data processing speed needed to properly encode or decode the data at the determined data rate.

16. The wireless device of claim 12, wherein the clock speed is associated with at least one of:
   the processor;
   the memory coupled to the processor;
   a modem circuit component used to modulate or demodulate data associated with the data transfer;
   a data processor circuit component used to process data associated with the data transfer;
   a memory circuit component used to store data associated with the data transfer; or
   a data bus circuit component used to move data associated with the data transfer among the circuit components.

17. The wireless device of claim 12, wherein to determine the data rate comprises:
   to determine, during a call setup, one or more signal conditions of a communication link associated with the data transfer; and
   to estimate, prior to beginning the data transfer, a data rate expected to be assigned to the wireless device based on the signal conditions.

18. The wireless device of claim 17, wherein the signal conditions are indicated by at least one of a received power measurement or a signal quality measurement.

19. The wireless device of claim 12, wherein to determine the data rate comprises to monitor, during the data transfer, a data rate assigned to the wireless device.

20. The wireless device of claim 19, wherein the processor is further configured to adjust, based on any changes to the data rate, the one or more data processing parameters corresponding to the data transfer.

21. The wireless device of claim 12, wherein the processor is further configured to artificially bias signal quality feedback information intended for a base station to imitate a lower quality of signal reception than actually received, if the determined data rate is above a predetermined threshold.

22. The wireless device of claim 20, wherein at least one data, processing parameter is adjusted to a level above the determined requirements based upon one or more applications running on the wireless device.

23. A non-transitory computer-readable storage medium comprising code, which, when executed by a processor, causes the processor to perform operations for managing energy usage of a wireless device during a data transfer in a wireless communication network, the non-transitory computer-readable storage medium comprising:
   code for determining a data rate associated with the data transfer;
   code for determining data processing requirements for processing data at the determined data rate;
   code for reducing, based on the determined requirements, a clock speed associated with one or more data processing parameters corresponding to the data transfer from a previous level;

code for reducing a corresponding operating voltage from a previous level in accordance with the reduced clock speed;

code for increasing, based on changed requirements, the clock speed from a previous level; and code for increasing the corresponding operating voltage from a previous level in accordance with the increased clock speed.

24. The non-transitory computer-readable storage medium of claim 23, wherein the reducing is performed at run-time.

25. The non-transitory computer-readable storage medium of claim 23, wherein processing data comprises at least one of encoding the data for transmission or decoding the data from received signals.

26. The non-transitory computer-readable storage medium of claim 25, wherein the data processing requirements indicate a minimum data processing speed needed to properly encode or decode the data at the determined data rate.

27. The non-transitory computer-readable storage medium of claim 23, wherein the clock speed is associated with at least one of:

a modem used to modulate or demodulate data associated with the data transfer;

a data processor used to process data associated with the data transfer;

a memory used to store data associated with the data transfer; or a data bus used to move data associated with the data transfer between processing components.

28. The non-transitory computer-readable storage medium of claim 23, wherein the code for determining the data rate comprises:

code for determining, during a call setup, one or more signal conditions of a communication link associated with the data transfer; and code for estimating, prior to beginning the data transfer, a data rate expected to be assigned to the wireless device based on the signal conditions.

29. The non-transitory computer-readable storage medium of claim 28, wherein the signal conditions are indicated by at least one of a received power measurement or a signal quality measurement.

30. The non-transitory computer-readable storage medium of claim 23, wherein the code for determining the data rate comprises code for monitoring, during the data transfer, a data rate assigned to the wireless device.

31. The non-transitory computer-readable storage medium of claim 30, further comprising code for adjusting, based on any changes to the data rate, the one or more data processing parameters corresponding to the data transfer.

32. The non-transitory computer-readable storage medium of claim 23, further comprising code for artificially biasing signal quality feedback information intended for a base station to imitate a lower quality of signal reception than actually received if the determined data rate is above a predetermined threshold.

33. The non-transitory computer-readable storage medium of claim 31, wherein at least one data processing parameter is adjusted to a level above the determined requirements based upon one or more applications running on the wireless device.

34. A wireless device for transferring data in a wireless communication network, the wireless device comprising:

one or more circuit component means for effectuating the data transfer; and power management means for managing energy use of the one or more circuit component means during the data transfer, the power management means comprising:

means for determining a data rate associated with the data transfer, means for determining data processing requirements for processing data at the determined data rate, means for reducing, based on the determined requirements, a clock speed associated with one or more data processing parameters corresponding to the data transfer from a previous level;

means for reducing a corresponding operating voltage from a previous level in accordance with the reduced clock speed;

means for increasing, based on changed requirements, the clock speed from a previous level; and means for increasing the corresponding operating voltage from a previous level in accordance with the increased clock speed.

35. The wireless device of claim 34, wherein the power management means further comprises means for processing data associated with the data transfer.

36. The wireless device of claim 34 wherein processing data comprises at least one of encoding the data for transmission or decoding the data from received signals.

37. The wireless device of claim 36, wherein the data processing requirements indicate a minimum data processing speed needed to properly encode or decode the data at the determined data rate.

38. The wireless device of claim 34, wherein the clock speed is associated with at least one of:

the power management means;

modem circuit component means for modulating or demodulating data associated with the data transfer;

data processor circuit component means for processing data associated with the data transfer;

memory circuit component means for storing data associated with the data transfer; or data bus circuit component means for moving data associated with the data transfer among the circuit component means.

39. The wireless device of claim 34, wherein the means for determining the data rate comprises:

means for determining, during a call setup, one or more signal conditions of a communication link associated with the data transfer; and means for estimating, prior to beginning the data transfer, a data rate expected to be assigned to the wireless device based on the signal conditions.

40. The wireless device of claim 39, wherein the signal conditions are indicated by at least one of a received power measurement or a signal quality measurement.

41. The wireless device of claim 34, wherein the means for determining the data rate comprises means for monitoring, during the data transfer, a data rate assigned to the wireless device.

42. The wireless device of claim 41, wherein the power management means further comprises means for adjusting, based on any changes to the data rate, the one or more data processing parameters corresponding to the data transfer.

43. The wireless device of claim 34, wherein the power management means further comprises means for artificially biasing signal quality feedback information intended for a base station to imitate a lower quality of signal reception than actually received if the determined data rate is above a predetermined threshold.

44. The wireless device of claim 42, wherein at least one data processing parameter is adjusted to a level above the determined requirements based upon one or more applications running on the wireless device.

45. A method for managing energy usage of a wireless device during a data transfer in a wireless communication network, the method comprising:
   determining a data rate associated with the data transfer;
   determining data processing requirements for processing data at the determined data rate;
   increasing, based on the determined requirements, a clock speed associated with one or more data processing parameters corresponding to the data transfer from a previous level; and
   increasing a corresponding operating voltage from a previous level in accordance with the increased clock speed.

46. A method for managing energy usage of a wireless device during a data transfer in a wireless communication network, the method comprising:
   determining a data rate associated with the data transfer;
   determining data processing requirements for processing data at the determined data rate, wherein processing data comprises at least one of encoding the data for transmission or decoding the data from received signals, and wherein the data processing requirements indicate a minimum data processing speed needed to properly encode or decode the data at the determined data rate;
   reducing, based on the determined requirements, a clock speed associated with one or more data processing parameters corresponding to the data transfer from a previous level; and
   reducing a corresponding operating voltage from a previous level in accordance with the reduced clock speed.

47. A method for managing energy usage of a wireless device during a data transfer in a wireless communication network, the method comprising:
   determining a data rate associated with the data transfer, wherein determining the data rate comprises monitoring, during the data transfer, a data rate assigned to the wireless device;
   determining data processing requirements for processing data at the determined data rate;
   reducing, based on the determined requirements, a clock speed associated with one or more data processing parameters corresponding to the data transfer from a previous level;
   reducing a corresponding operating voltage from a previous level in accordance with the reduced clock speed; and
   adjusting, based on any changes to the data rate, the one or more data processing parameters corresponding to the data transfer, wherein at least one data processing parameter is adjusted to a level above the determined requirements based upon one or more applications running on the wireless device.

* * * * *